Nov. 6, 1951  L. M. KAHN  2,574,149
ARTICLE CARRIER FOR WASHING MACHINES AND TRAY THEREFOR
Filed March 3, 1944
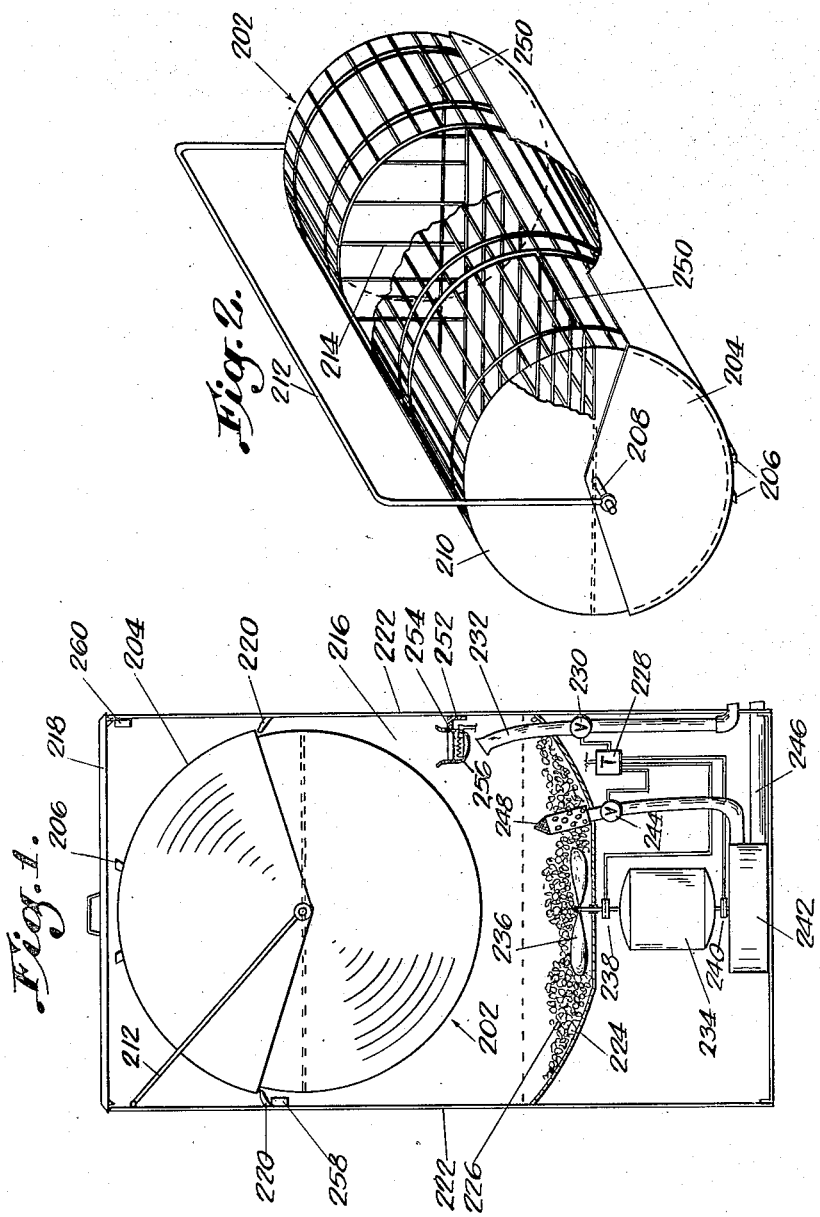
INVENTOR.
LEO M. KAHN
BY Irving F. Goodfriend
ATTORNEY Patented Nov. 6, 1951

2,574,149

UNITED STATES PATENT OFFICE 2,574,149

ARTICLE CARRIER FOR WASHING MACHINES AND TRAY THEREFOR

Leo M. Kahn, New York, N. Y.

Application March 3, 1944, Serial No. 524,893

6 Claims. (Cl. 134—104)

1

The present invention relates to an apparatus for washing at one time a relatively large quantity of dishes, cutlery, kitchen utensils and the like.

Heretofore in restaurants and the like establishments, clubs and even large private residences or estates, where dishes, kitchen utensils, cutlery and the like are continuously used, the dirty and greasy dishes as well as the cutlery and other utensils were individually washed and cleaned by hand.

This was relatively costly in labor, time consuming and was not completely satisfactory, particularly in those establishments where a better grade of china is used because of resulting breakage thereof.

The present invention therefore contemplates the provision of an apparatus by means of which a comparatively large quantity of dishes and the like, which are haphazardly inserted therein irrespective of their shape, may be automatically washed and cleaned for further use.

It will be recognized that in such establishments, the used dishes and the like often become caked with hardened grease and the remnants of food served therein so that heretofore attempts to provide satisfactory washing machines have failed because means were not provided whereby the caked and hardened clinging grease and food particles were satisfactorily removed by the prior machines in a comparatively short time and without too much breakage.

The present invention therefore contemplates the provision of a washing machine in which means are provided for removing all caked and hardened food particles or other substances that may cling to the dishes and the like and concurrently subjecting the dishes to the washing action of a cleaning fluid or water in which such cleaning means is mixed.

The present invention relates generally to an apparatus for washing and handling such articles as dishes, cutlery, kitchen utensils and the like. Specifically, it relates to an apparatus comprising an article washing compartment, a perforated basket disposable therewithin, and a tray rotatably mounted for pivotal movement about said basket. Thus, when the basket is within the compartment during the washing operations, the tray is supported over the basket to prevent splashing of the washing materials out of the compartment, and when the basket is removed from the housing, the tray will swing to position below the basket to function as a drip pan to catch the drippings from the washed articles

2 within the basket. With such device, as will be obvious, a single washing machine and a plurality of basket and tray combinations, will permit the cleansing of a larger number of articles than could be handled by a single machine.

In the drawings annexed hereto, forming a part hereof,

Figure 1 is an elevational view of one form of device constructed according to and embodying the present invention; and Figure 2 is a perspective view of a removable wire dish-carrying basket used therewith.

The wire mesh basket 202 is of size and configuration to receive a plurality of dishes, crockery, utensils and the like therewithin.

This basket is supported in the carrying tray 204 on the bottom of which legs 206 are arranged so that the tray may be rested on an available surface when the basket is loaded.

Extending from the pins 208 at the sides 210 of the basket 202 and pivoted thereto, I provide the carrying handle 212.

The basket 202 may, if desired, be divided into sections by means of the spaced screens 214.

After the basket 202 is loaded it is inserted into the washing compartment 216 which is opened by removing the closure 218.

The basket 202 is held in position by rotating the carrying tray 204 about the pins 208 to the top of the basket so that the tray is releasably engaged by the lugs 220 extending across the sides 222 of the washing compartment. The tray 204 when in the position of Figure 1 serves as a baffle to keep the cleaning water in the washing compartment.

The washing compartment at the bottom thereof is provided with the preferably cone shaped trough 224 in which the washing materials 226 are carried. This shape is, as will be understood, merely for illustrative purposes.

In operation, the switch controlled timer 228 is operated to open the valve 230 to fill the washing compartment 216 with the desired quantity of water through the inlet pipe 232, after which the valve 230 is closed.

The timer then commences operation of the motor 234 which is connected to the propeller 236 by throwing in the clutch 238.

Operation of the propeller agitates and sends a spray of the washing materials upwardly through the wire mesh basket 202 to clean the dishes and the like as previously described.

After the cleaning operation is completed the timer 228 disconnects the clutch 238 and connects the clutch 240 to cause operation of the suction pump 242 and concurrently opens the valve 244 to discharge the dirty water through the outlet pipe 246.

With the suction pump in operation and the discharge valve 244 open, the timer opens the valve 230 to spray the dishes and the like with clean water.

After the spraying operation the suction pump withdraws all water from the washing compartment 216 after which operation of the apparatus is stopped by the timer 228.

If desired, any embodiment of my invention may be provided with the sterilizing means which I shall now describe and which is illustrated in the dishwashing machine illustrated in Figure 1.

Referring now to that Figure, I secure the bracket 252 to a side of the washing compartment 222 on which bracket a cuplike member 254 is carried. This cup member is of such size that it will contain at least eight ounces of water. At the bottom of the cup and arranged so that it is covered, I provide an electrical resistance 256 which is connected to the timer 228, as by the conventional wiring 257.

After the spraying operation, by reason of which the cup 254 will be filled with water, the timer 228 closes the circuit through the resistance 256 to thereby convert the water in the cup into steam, which circulates through the dishes and the like to thereby sterilize them.

If desired, this form of sterilization may be substituted for by a violet ray lamp, which also has sterilizing properties.

My invention may also be provided with safety switches, an illustration of which is also shown in Figure 1, by means of which the machine cannot be operated unless the dish containing drums and the washing compartment cover or either are in position. For example on the lugs 220, I arrange a switch 258, which is closed by the weight of the cylinder 202 and at the upper part of the washing compartment 222, I arrange a switch 260 in series with the switch 258 and which is closed by the cover 218.

These switches are connected to the timer 228 so that it will not operate unless they are closed.

It will be further understood that, if desired, my invention may be provided with means for circulating heated or unheated air through the washing compartment and which means may be automatically operated by a timer after the washing and rinsing operations have been completed in order that the dishes and the like may be dried before they are removed from the dish washing machine.

It will now be recognized that I have provided a dish and the like washing machine in which the washing materials are directed against the dishes and the like to remove any dirt, grit or grime or particles of food that may adhere thereto.

While I have described my invention in certain details, schematically shown, I do not intend to be limited thereto, but desire to claim my invention as broadly as the prior art and the scope of the appended claims will permit.

I claim:

1. A washing machine for soiled articles comprising a washing compartment, article carrying means movably maintained in said compartment so as to subject said articles to a washing action and being removable from said compartment at the termination of said washing action, a tray movably mounted on said article carrying means so as to be positioned thereunder when removed from said compartment and to function as a drip pan therefor, manually operable means to rotate said tray relative to said carrying means on disposition of same in said compartment so as to expose said soiled articles to said washing action, said tray being operative in said raised position to serve as a closing cover for said article carrying means, and means to releasably retain the tray over the carrying means when the latter is disposed within the compartment.

2. A washing machine for soiled articles comprising a washing compartment, article carrying means removably maintained in said compartment so as to subject said articles to a washing action and being removable from said compartment at the termination of said washing action, a tray movably mounted on said article carrying means so as to be positioned thereunder when removed from said compartment and to function as a drip pan therefor, and means to raise said tray relative to said carrying means and means to retain the tray in position over the carrying means to expose said articles to the action of a washing medium in said compartment, when the carrying means is disposed within the compartment.

3. A washing machine for soiled articles comprising a washing compartment, basket means removably maintained in said compartment so as to subject said articles to a washing action and being removable from said compartment at the termination of said washing action, an imperforate tray rotatably mounted on said basket means and automatically swingable to position thereunder when removed from said compartment so as to function as a drip pan therefor, said tray being rotatable to a position above said basket prior to insertion of the basket into said compartment so as to expose said articles to the action of a washing medium in said compartment and to constitute a closing cover for said basket so as to confine said washing medium therebelow and prevent its escape from the top of said washing compartment, and means on the compartment to retain the tray over said basket when said basket is in the compartment.

4. A washing machine for soiled articles comprising a washing compartment, article carrying means removably maintained in said compartment so as to subject said articles to a washing action and being removable from said compartment at the termination of said washing action, a tray movably mounted on said article carrying means so as to be positioned thereunder when removed from said compartment and to function as a drip pan therefor, means to raise said tray relative to said carrying means prior to insertion of the basket into said compartment so as to expose said articles to the action of a washing medium in said compartment, and means in said compartment for engaging said tray in raised position so as to maintain said article carrying means in a washing position in said compartment.

5. A washing machine for soiled articles comprising a washing compartment, a perforated basket removably maintained in said compartment so as to subject said articles to a washing action and being removable from said compartment at the termination of said washing action, an imperforate tray rotatably mounted on the ends of said basket and normally positioned thereunder when the basket is removed from said compartment so as to function as a drip pan therefor, said tray being rotatable to an upward position immediately prior to the insertion of the basket into said compartment whereby said soiled articles may be exposed to the action of said washing machine, and means on the compartment to retain the tray over said basket when said basket is in washing position in the compartment.

6. A washing machine for soiled articles comprising a washing compartment, a perforated basket removably maintained in said compartment so as to subject said articles to a washing action and being removable from said compartment at the termination of said washing action, a tray rotatably mounted on the ends of said basket and normally positioned thereunder when the basket is removed from said compartment so as to function as a drip pan therefor, said tray being rotatable to an upward position when said basket is installed in said compartment whereby said soiled articles may be exposed to the action of said washing machine, and lugs in said washing compartment for engaging said tray and maintaining it in the upward or raised position.

LEO M. KAHN.

REFERENCES CITED

The following references are of record in the file of this patent:

UNITED STATES PATENTS

| Number | Name | Date |
| --- | --- | --- |
| 846,263 | Tibbits | Mar. 5, 1907 |
| 1,084,275 | Hess | Jan. 13, 1914 |
| 1,143,216 | McGrath | Jan. 15, 1915 |
| 1,517,218 | Marx | Nov. 25, 1924 |
| 1,656,344 | Casoletti | Jan. 17, 1928 |
| 1,671,557 | Tyler | May 29, 1928 |
| 1,919,541 | Davis | July 25, 1933 |
| 2,033,630 | Gould | Mar. 10, 1936 |